Patented Feb. 20, 1934

1,947,776

UNITED STATES PATENT OFFICE 1,947,776

PURIFICATION OF GAS

Wilbert J. Huff, Lloyd Logan, and Oscar William Lusby, Baltimore, Md.

No Drawing. Application January 28, 1928
Serial No. 250,331

11 Claims. (Cl. 23—2)

This invention relates to the purification of gas, with especial reference to the elimination of sulfur compounds from combustible gas. Such purification is important in the preparation of gas for domestic and industrial purposes. Generally, however, in the manufacture of gas for such use the removal of sulfur compounds has been limited to the elimination of hydrogen sulfide. The importance of the elimination, likewise, of organic sulfur compounds in effecting a reduction in the corrosion of apparatus for gas manufacture and utilization and of gas distribution systems is becoming recognized. Of increasing importance, also, is the complete elimination of sulfur compounds from gas in processes involving catalytic reactions.

A method for the catalytic conversion of organic sulfur to hydrogen sulfide at elevated temperatures has been described in the application of Oscar W. Lusby, Serial No. 250,338 filed Jan. 28, 1928, Patent 1,900,882. We have, in the further study of the removal of sulfur compounds from gas, found means for eliminating hydrogen sulfide, or the hydrogen sulfide together with the organic sulfur, at elevated temperatures by means of purifying materials, together with means for maintaining the activity of these materials over a considerable period of time.

The object of the present invention is to provide a gas purifying process employing purifying materials which react readily at an elevated temperature with the sulfur in hydrogen sulfide and organic sulfur impurities of gas and retain the sulfur until they are subsequently revivified by various methods, including the passage thereover of air or other oxygen containing gas. We have considered the reaction to be a combination of the reaction of hydrogen sulfide with the metal to form a metallic sulfide with either the direct chemical reaction of the organic sulfur with the metal or by the catalytic conversion of the organic sulfur to hydrogen sulfide with subsequent reaction of the latter with the purifying mass to form a sulfide. Our invention is based, however, not on any particular theory as to the exact mechanism of the reactions involved, but on the experimentally determined facts. In the research upon which this invention is based, we have developed a number of materials which fulfill the requirements. While it is possible in certain cases to use a single metal as a purifying agent, it is generally preferable to use mixtures of metals or metallic compounds. Among these, we have found combinations of copper, silver, iron, nickel, cobalt, lead, tin, and antimony, or their oxides, with metals, or oxides of metals, of the sixth and seventh groups of the periodic system of the elements according to Mendeleef (as shown in the table on pages 474 and 475 of the Chemical Rubber Handbook of Chemistry and Physics by Hodgman and Lange, 13th edition, 1928) to be effective. Of these we have found various combinations of copper and chromium, copper and uranium, and of copper, chromium, and uranium to be especially active in the absorption of the sulfur compounds and capable of being readily revivified.

Where the term metal is used, or the metal is named, in these specifications it is understood that we intend to cover not only the metal but also the metal equivalent, as the oxide. This will be understood from our description of methods for preparing and using the purifying materials. When equivalents of the metal are taken an equivalent added weight must be used in the formula in accordance with chemical theory.

Typical combinations which have been found especially satisfactory are: 80% copper and 20% chromium, 80% copper and 20% uranium, 80% copper, 10% uranium, and 10% chromium.

In the preparation of these materials, several methods have been practiced to secure intimate mixture of the components and to obtain materials resistant to crumbling under the conditions of operation. With certain materials this can be accomplished by precipitation of the materials from a mixture of solutions of their salts such as their nitrates and, after washing, drying or compressing the precipitate. We have found that it is possible to secure a satisfactory material merely by mixing two metallic constituents together and heating with or without the addition of some third material, thus in the case of combinations of copper with other metals, the copper oxide may be intimately mixed with the other constituent or constituents and melted in an oxidizing flame. When this method is selected, the molten mass may be poured from a height into water to give a hard, shot-like, material which is very resistant to crumbling. Further methods of preparation include the addition of the solutions of the nitrates or other compounds of the components of the material to a suitable carrier and heating to decompose the compounds, leaving an intimate mixture of the oxides of the metals on the carrier. The carrier, when used, may be of chemically inert porous material such as pumice or firebrick, or a substance, such as a metallic material of which copper or copper oxide are examples. Natural ores containing the more satisfactory constituents may also be used.

In the use of the purifying materials, the hot gas to be purified is passed over the materials in any suitable apparatus, preferably after removal of dust from the gas, which can be accomplished either mechanically, by electrical precipitation, or by a combination of the two methods. At suitable intervals the passage of the gas is interrupted and the purifying materials revivified by any of several methods, for instance, by the passage thereover of air at elevated temperature, the products of the combustion of the sulfur compounds being discharged to the atmosphere or being utilized in the manufacture of sulfuric acid, or for other purposes. Although revivification by air is perhaps the most suitable method, various other methods, such as the use of a relatively inert gas, as blast gas in the manufacture of water gas (with the addition, if necessary of small amounts of oxygen or air) are not excluded. The duration of the periods for absorption of the sulfur compounds and of revivification of the material may be determined in certain cases by the absorptive capacity of the purifying mass for sulfur compounds and in other cases, as in the manufacture of water gas, by the cycle used in the gas manufacturing process. The temperature of the purifying materials may be varied considerably, both with respect to the temperature for absorption of the sulfur compounds and to the temperature for revivification of the materials. A temperature of about 450° C. has been found satisfactory for both absorption and revivification in case of the particular materials above mentioned. The optimum temperature may be varied considerably for other materials covered by this application and in certain cases it may be found advisable to use one temperature for absorption and a different temperature for revivification.

The process effects a rapid and complete removal of hydrogen sulfide and organic sulfur from the gas undergoing treatment, utilizing the sensible heat of the gas and taking advantage of the increased speed of reaction of the sulfur compounds in the gas with the metals and compounds constituting the purifying materials to form such compounds as sulfides. With this greatly increased rate of reaction, the size of the apparatus may be made extremely small. It may also be pointed out that the purifying materials are effective in removing a portion, at least, of the oxygen from the gas, which is of considerable importance in reducing corrosion in the gas distribution system and in reducing the dilution of the combustible gas. The process is especially applicable in the case of catalytic processes which require completely or substantially sulfur-free gas. It may also be used in combination with other sulfur removal processes if desired.

Wherever in the claims the term metal is employed, it is intended to cover thereby not only the metal but also its equivalents as described in the specification.

Having described our invention, we claim:

1. A cyclic process for treating combustible gases containing organic sulfur compounds and hydrogen sulfide which comprises passing the gas at an elevated temperature above 250° C. over a unitary absorbent material consisting of an intimate mixture of substances one component of which forms a metallic oxide easily reducible to the metal under the conditions of use, in mixture with another component which contains at least one member of the sixth to the seventh group of the periodic system which forms an oxide not reducible under the conditions of use, whereby the sulfur is removed, followed by the revivification of the absorbent by an oxygen containing gas in another phase of the cycle.

2. A cyclic process as described in claim 1 using a combustible gas which may be free from oxygen, whereby the sulfur is fixed without the addition of an oxidant to the combustible gas.

3. A cyclic process as described in claim 1 in which the sulfur is fixed without the addition of an oxidant to the gas, and of revivifying the purifying material out of contact with a reducing gas by the action of an oxidizing gas.

4. A cyclic process of gas purification at a temperature above 250° C. comprising a method of bringing gas containing as impurities sulfur compounds and which may be free from oxygen in contact with a purifying material consisting of copper in intimate association with at least one chemical containing at least one element contained in the classification comprising the fourth and twelfth series of the sixth and seventh groups of the periodic system, whereby the sulfur of the said impurities is fixed without the addition of an oxidant to the gas, and of revivifying the purifying material by the action of an oxidizing gas.

5. The cyclic process of gas purification as described in claim 4 in which the revivification is effected by the mixture of an oxygen-containing gas with hot blast gas.

6. The cyclic process of gas purification as described in claim 4 in which the cycle is determined by the cycle used in the gas manufacturing process.

7. The cyclic process of water gas purification described in claim 4 in which the purifying period is determined by the period of water gas making and the revivifying period is determined by the blasting period of the water gas machine.

8. A cyclic process of gas purification at a temperature above 250° C. comprising a method of bringing gas containing as impurities sulfur compounds and which may be free of oxygen in contact with a purifying material containing copper in intimate association with chromium oxide, whereby the sulfur of the said impurities is fixed without the addition of an oxidant to the gas and of revivifying the purifying material by the action of an oxidizing gas.

9. A cyclic process of gas purification at a temperature above 250° C. comprising a method of bringing gas containing as impurities sulfur compounds and which may be free of oxygen in contact with a purifying material containing copper in intimate association with uranium and chromium oxides, whereby the sulfur of the said impurities is fixed without the addition of an oxidant to the gas and of revivifying the purifying material by the action of an oxidizing gas.

10. A cyclic process of gas purification as described in claim 8 in which the cyclic of purification and revivification is determined by the cycle of the gas machine and the revivification is accomplished by the blast gases to which an oxygen-containing gas has been added.

11. A cyclic process of gas purification as described in claim 9 in which the cycle of purification and revivification is determined by the cycle of the gas machine and the revivification is accomplished by the blast gases to which an oxygen-containing gas has been added.

WILBERT J. HUFF.
LLOYD LOGAN.
OSCAR WILLIAM LUSBY.